United States Patent
Zhang et al.

(10) Patent No.: US 11,514,716 B2
(45) Date of Patent: Nov. 29, 2022

(54) FACE MATCHING METHOD AND APPARATUS, STORAGE MEDIUM

(71) Applicant: Beijing Sensetime Technology Development Co., Ltd., Beijing (CN)

(72) Inventors: Fan Zhang, Beijing (CN); Binxu Peng, Beijing (CN)

(73) Assignee: Beijing Sensetime Technology Development Co., Ltd., Beijing (CN)

( * ) Notice: Subject to any disclaimer, the term of this patent is extended or adjusted under 35 U.S.C. 154(b) by 195 days.

(21) Appl. No.: 17/004,761

(22) Filed: Aug. 27, 2020

(65) Prior Publication Data

US 2020/0394391 A1    Dec. 17, 2020

Related U.S. Application Data

(63) Continuation of application No. PCT/CN2018/122887, filed on Dec. 21, 2018.

(30) Foreign Application Priority Data

Jun. 5, 2018  (CN) .......................... 201810569921.8

(51) Int. Cl.
*G06V 40/16* (2022.01)
*G06V 10/75* (2022.01)

(52) U.S. Cl.
CPC .......... *G06V 40/172* (2022.01); *G06V 10/757* (2022.01); *G06V 40/171* (2022.01); *G06V 40/178* (2022.01)

(58) Field of Classification Search
CPC .. G06V 40/172; G06V 40/171; G06V 10/757; G06V 10/762; G06V 40/178
See application file for complete search history.

(56) References Cited

U.S. PATENT DOCUMENTS

| | | | |
|---|---|---|---|
| 7,760,917 B2* | 7/2010 | Vanhoucke | G06F 16/5846 382/115 |
| 8,983,229 B2* | 3/2015 | Park | H04N 1/00453 382/284 |
| 9,342,855 B1* | 5/2016 | Bloom | G06Q 50/01 |
| 2004/0117638 A1* | 6/2004 | Monroe | G08B 25/016 713/186 |

(Continued)

FOREIGN PATENT DOCUMENTS

| CN | 104331509 A | 2/2015 |
|---|---|---|
| CN | 105243060 A | 1/2016 |

(Continued)

OTHER PUBLICATIONS

International Search Report and Written Opinion for Application No. PCT/CN2018/122887, dated Mar. 21, 2019, 11 pages.

(Continued)

*Primary Examiner* — Shaghayegh Azima (57) ABSTRACT

Examples of the present disclosure provide a face matching method and a face matching apparatus, and a storage medium. The face matching method includes: obtaining a first attribute of first face information which is to be matched; determining one or more preferential matching ranges based on the first attribute; and comparing the first face information with second face information in the one or more preferential matching ranges.

14 Claims, 3 Drawing Sheets

(56) References Cited

U.S. PATENT DOCUMENTS

| | | | |
|---|---|---|---|
| 2008/0080745 A1* | 4/2008 | Vanhoucke | G06V 20/30 707/E17.023 |
| 2014/0334734 A1* | 11/2014 | Xiong | G06V 40/172 382/159 |
| 2017/0097948 A1 | 4/2017 | Kerr et al. | |
| 2022/0128574 A1* | 4/2022 | Schmidt | G01N 33/6893 |

FOREIGN PATENT DOCUMENTS

| | | |
|---|---|---|
| CN | 106560810 A | 4/2017 |
| CN | 106776619 A | 5/2017 |
| CN | 108009465 A | 5/2018 |
| CN | 108009521 A | 5/2018 |
| CN | 108921034 A | 11/2018 |
| JP | 2012252654 A | 12/2012 |
| JP | 5876920 B1 | 3/2016 |

OTHER PUBLICATIONS

First Office Action for Chinese Application No. 201810569921.8, dated Apr. 12, 2019, 10 pages.
Second Office Action for Chinese Application No. 201810569921.8, dated Sep. 11, 2019, 11 pages.
Third Office Action for Chinese Application No. 201810569921.8, dated Feb. 6, 2020, 12 pages.
Japanese Patent Office Action, Office Action Issued in Application No. 2020-560795, dated Dec. 10, 2021, 6 pages.
ISA State Intellectual Property Office of the People's Republic of China, Written Opinion of the International Searching Authority Issued in Application No. PCT/CN2018/122887, dated Mar. 21, 2019, WIPO, 10 pages.

* cited by examiner

FACE MATCHING METHOD AND APPARATUS, STORAGE MEDIUM

CROSS-REFERENCE OF RELATED APPLICATIONS

This application is a continuation of International Application No. PCT/CN2018/122887, filed on Dec. 21, 2018, which is based on and claims priority to Chinese Patent Application No. 201810569921.8, filed on Jun. 5, 2018, all of which are incorporated herein by reference in their entirety.

TECHNICAL FIELD

The present disclosure relates to, but is not limited to, the field of information technologies, and in particular to a face matching method and a face matching apparatus, and a storage medium.

BACKGROUND

Face matching is to compare an acquired face image with face images previously obtained, so as to recognize an identification of a person corresponding to the acquired face image. Face matching is a portrait recognition or facial recognition technology. However, it is found in the related art that efficiency of face matching is so low to cause a large feedback delay of face matching.

SUMMARY

In view of this, embodiments of the present disclosure intend to provide a face matching method and a face matching apparatus, and a storage medium.

The technical solution of the present disclosure is implemented as follows.

In a first aspect, examples of the present disclosure provide a face matching method, including:
  obtaining a first attribute of first face information which is to be matched;
  determining one or more preferential matching ranges based on the first attribute; and
  comparing the first face information with second face information in the one or more preferential matching ranges.

In a second aspect, examples of the present disclosure provide a face matching apparatus, including:
  a first obtaining module configured to obtain a first attribute of first face information which is to be matched;
  a determining module configured to determine one or more preferential matching ranges based on the first attribute; and
  a first matching module configured to compare the first face information with second face information in the one or more preferential matching ranges.

In a third aspect, examples of the present disclosure provide an electronic device, including:
  a memory; and
  a processor coupled to the memory, and configured to implement the method provided in the above one or more technical solutions by executing computer executable instructions located on the memory.

In a fourth aspect, examples of the present disclosure provide a computer storage medium storing computer executable instructions that, when executed, cause the method provided in the above one or more technical solutions to be implemented.

In a fifth aspect, examples of the present disclosure provide a computer program product including computer executable instructions that, when executed, cause the method provided in the above one or more technical solutions to be implemented.

In the face matching method and the face matching apparatus and the storage medium provided in the examples of the present application, before performing face matching, the first attribute of the first face information which is to be matched is obtained firstly, and then the second face information to be compared is filtered based on the first attribute, so as to determine a preferential matching range. The first face information is preferentially compared with the second face information in the preferential matching range. Since the first attribute reflects an attribute of the first face information, an attribute corresponding to the second face information in the preferential matching range is compared with the first attribute.

In a first aspect, the second face information within the one or more preferential matching ranges has a higher probability of successfully matching the first face information than the second face information outside the one or more preferential matching ranges. Apparently, prioritizing the second face information within the one or more preferential matching ranges for comparing can find a piece of second face information that successfully matches the first face information more quickly, thus improving the matching efficiency and realizing fast face matching.

In a second aspect, the one or more preferential matching ranges are used to compare the first face information. If the second face information matching the first face information is quickly found within the one or more preferential matching ranges, the comparing can be finished, thereby reducing a number of comparing operations, an amount of information needed, and a load of a server for performing face information comparing, and removing unnecessary comparing operations.

DETAILED DESCRIPTION OF THE EMBODIMENTS

The technical solution of the present disclosure will be further elaborated below with reference to the drawings and specific examples of the specification.

Figure 1:
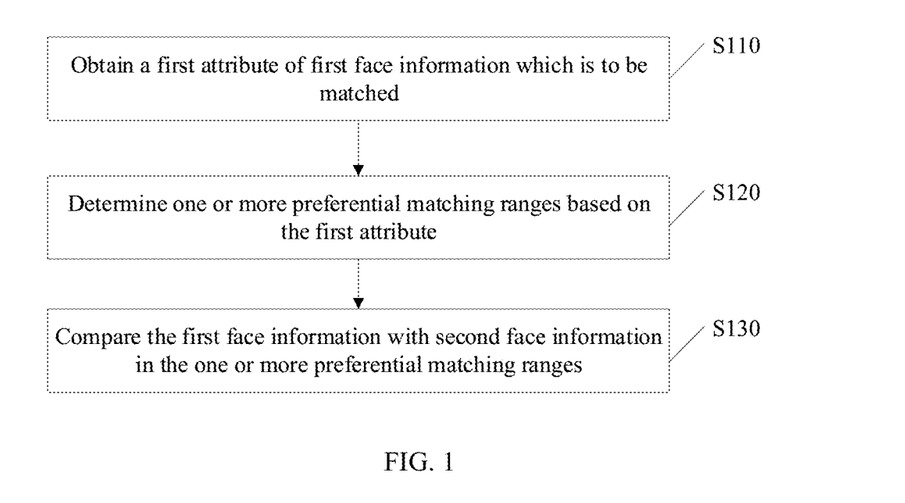
FIG. 1 illustrates a schematic flowchart of a first face matching method according to an example of the present application.

As shown in FIG. 1, a face matching method according to an example includes the following steps S110-S130.

At step S110, a first attribute of first face information which is to be matched is obtained.

At step S120, one or more preferential matching ranges are determined based on the first attribute.

At step S130, the first face information is compared with second face information in the one or more preferential matching ranges.

Figure 2:
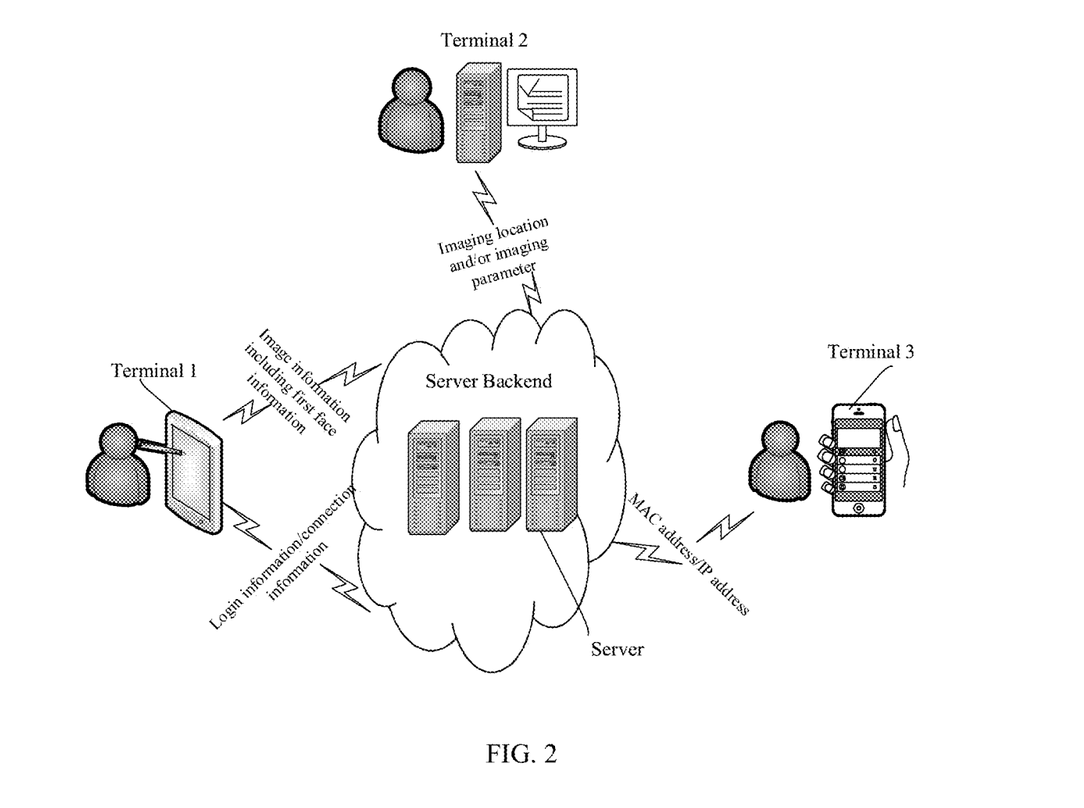
FIG. 2 illustrates a schematic structural diagram of a face matching system according to an example of the present application.

The face matching method provided in this example can be applied to an electronic device such as a database or a background server. FIG. 2 shows a face matching system, including: a service backend, including one or more servers in the service backend, and this method can be applied to the server. In FIG. 2, terminal 1, terminal 2, and terminal 3 are shown. It is worth noting that there are three types of terminals shown in FIG. 2. However, in specific implementation, the terminal connected to the server can be various types of terminals, for example, various types of mobile terminals or non-mobile terminals which are not limited to those shown in FIG. 2. The terminal can submit, to the server, various information including image information, login information, MAC address, IP address and connection information, imaging location, an imaging parameter of the first face information and/or the like.

At step S110, the server can receive the first face information from a terminal device, and then obtain the first attribute based on an attribute extraction rule, and determine the one or more preferential matching ranges based on the first attribute.

The first attribute may include: one or more attribute values. The preferential matching range may be determined through one or more attribute values. If a preferential matching range is determined from N attribute values and more than two preferential matching ranges are determined from M attribute values, an intersection of multiple preferential matching ranges may be obtained as a final preferential matching range by taking the form of intersection, where both N and M are positive integers; and M may be greater than N. In other examples, to reduce missing matches, at least two preferential matching ranges determined through the M attribute values may be merged to obtain a merged preferential matching range, and the merged preferential matching range may be regarded as a range required for matching or be regarded as a final matching range. In some examples, a preferential matching range corresponding to the intersection may be a matching range with a first priority level, and if a preferential matching range corresponding to a union is not a preferential matching range for final comparing, it may be a preferential matching range with a second priority level. The first priority level is higher than the second priority level. In short, there may be multiple preferential matching ranges, and priority levels may be set for the multiple preferential matching ranges respectively.

The priority of the priority level for comparing here can be reflected in at least one of the following aspects.

Comparing sequence. If multiple preferential matching ranges are compared in sequence, the preferential matching range with a high priority level is compared first, and the preferential matching range with a low priority level is compared later.

Priority order of matched results. If each of multiple preferential matching ranges with different priority levels has second face information matched the first face information, the second face information matched the first face information, which belongs to a preferential matching range with a high priority level is preferably selected as a final matched result for output. For example, in some examples, the comparing sequence is not limited for the preferential matching ranges with different priority levels, and the preferential matching ranges with different priority levels may be matched at the same time to obtain multiple pieces of second face information from different preferential matching ranges that are matched the first face information, second face information from the preferential matching range with the high priority level is selected in priority as the final matched result for output.

The preferential matching range may include: an information database including multiple pieces of second face information. Generally, a data amount of the second face information included in the preferential matching range is smaller than a data amount of the second face information included in a full-volume database. Compared with a non-preferential matching range, where the non-preferential matching range is a range in the full-volume database other than the preferential matching range, the preferential matching range has a higher probability to include second face information that satisfies a matching condition with the first face information.

Compared with the full-volume database, the preferential matching range reduces the amount of second face information that is to be compared, and there is a higher probability to provide the second face information that matches the first face information, thus having a smaller number of times of comparing and higher efficiently of comparing, and being capable of finding the second face information that matches the first face information more quickly.

In some examples, both the first face information and the second face information may be an image that includes a face graphic, or a text that includes facial features.

Figure 3:
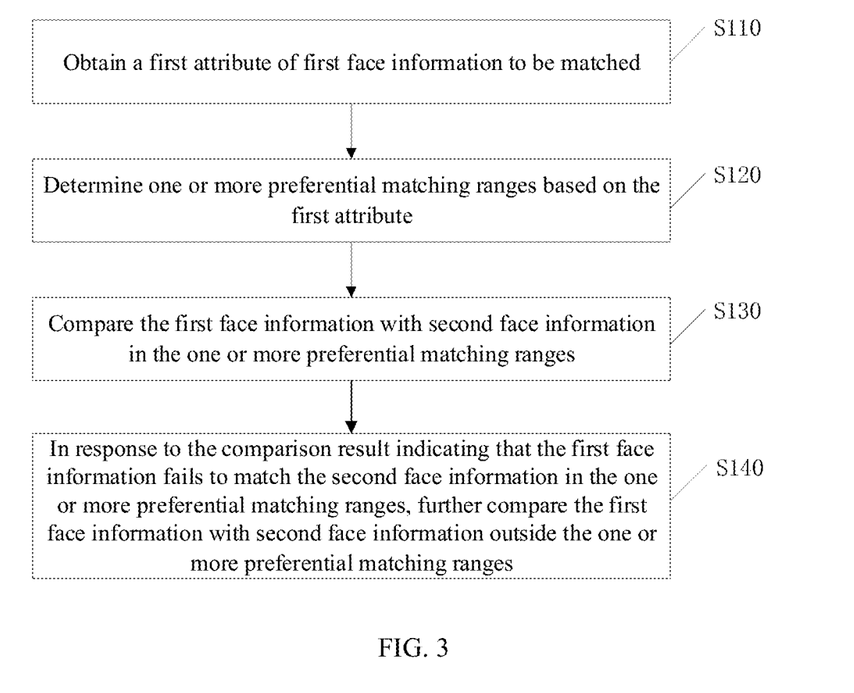
FIG. 3 illustrates a schematic flowchart of a second face matching method according to an example of the present application.

In other examples, as shown in FIG. 3, the method further includes the following step S140.

Step S140, in response to the comparison result indicating that the first face information fails to match the second face information in the one or more preferential matching ranges, the first face information is further compared with second face information outside the one or more preferential matching ranges.

If the first face information is not successfully matched in the one or more preferential matching ranges (that is, the first face information fails to match a piece of second face information within the one or more preferential matching ranges), the first face information is continued to be compared with second face information in a non-preferential matching range until second face information that successfully matches the first face information is recognized, or until comparing with second face information in the full-volume database is completed.

In this example, if the first face information fails to match the second face information in the one or more preferential matching ranges, the first face information is further compared with the second face information outside the one or more preferential matching ranges. Thus, a missing problem due to comparing only with the second face information in the one or more preferential matching ranges can be avoided, and the comparing can be ensured to be successful if there is second face information matched the first face information in the full-volume database.

In some examples, step S110 may include at least one of the following:

obtaining a subject attribute of a first imaged subject based on the first face information; or obtaining an imaging parameter for collecting the first face information.

The first attribute may be first face information of a first imaged subject, the first imaged subject may be an imaged subject, and the first face information may be information formed in collecting the first imaged subject. The subject attribute is information describing the first imaged subject.

In some examples, the subject attributes may include:
information of the first imaged subject such as gender, age, height, body shape, etc.

For example, a terminal device collects image information from a photo, a video, or the like, and the image information may be a full-body image including the first face information or a half body image including the first face information. First, based on face graphics, an electronic device such as a server can recognize a gender of the first imaged subject corresponding to the face graphics. For example, the server can recognize the gender of the first imaged subject based on a recognition model. The recognition model may include: a data model trained by sample data. The data model may include: a big data model such as a neural network, a binary tree model, a linear regression model, or a vector machine. The recognition model includes a data model, but is not limited to a data model.

For another example, if the image information includes the half-body image, a weight range of the first imaged subject (corresponding to its body shape) may be inferred based on the half-body image in combination with imaging parameters of the terminal device (e.g., focal length and imaging angle), etc.

For another example, if the image information includes the full-body image, a height range of the first imaged subject may be estimated based on the full-body image in combination with the imaging parameters of the terminal device.

In some examples, information such as the hair length, dress and accessories of the first imaged subject may also be determined based on the half-body or full-body image. The accessories may include a stud, an earring, a headdress or a necklace, hand accessories, etc.

In short, the subject attribute can be information describing characteristics of the imaged subject.

The imaging parameter may include: an imaging location of the image information, imaging time of the image information, and scene feature information of a space corresponding to the imaging location of the image information.

For example, if the imaging location of the image information is in country A, the residential address of the first imaged subject may be country A.

In some examples, obtaining the subject attribute of the first imaged subject based on the first face information includes at least one of the following:
obtaining a gender of the first imaged subject based on the first face information;
obtaining an age of the first imaged subject based on the first face information;
obtaining a hair length of the first imaged subject based on the first face information; or
obtaining wear of the first imaged subject based on the first face information.

In some examples, step S120 may include at least one of the following:
determining a first preferential matching range based on the gender of the first imaged subject, where a gender of a second imaged subject corresponding to second face information included in the first preferential matching range is the same as that of the first imaged subject;
determining a second preferential matching range based on the age of the first imaged subject, where an age of a second imaged subject corresponding to second face information included in the second preferential matching range is matchable with that of the first imaged subject;
determining a third preferential matching range based on the hair length of the first imaged subject, where a hair length of a second imaged subject corresponding to second face information included in the third preferential matching range is matchable with that of the first imaged subject; or
determining a fourth preferential matching range based on the wear of the first imaged subject, where particular wearing or accessories of a second imaged subject corresponding to second face information included in the fourth preferential matching range is the same as that of the first imaged subject.

In some examples, an age stage of the first imaged subject may be determined by analyzing the first face information or the image information including the first face information. For example, the first imaged subject may be determined as an infant, a child, a teenager, a youth or the elderly. In some examples, a specific age range may also be distinguished, for example, an age range of 5 years is taken as an age interval, and the specific age range is determined by analyzing the first face information or the image information including the first face information. In other examples, if the first face information is from a video, information such as the age stage and the gender may also be determined based on the voice information collected in the video.

The hair length may be divided at least into short hair and long hair. In other implementations, the hair length may be further divided into: ultra-short hair, short hair, medium-long hair, long hair, extra-long hair and so on. For example, a body portion of the first imaged subject may be used as a distinguishing point to distinguish the hair length. For example, a crew cut may be regarded as the ultra-short hair, except the ultra-short hair, a hair length above the ears may be regarded as the short hair; a hair length below the ears and above the shoulders may be regarded as the medium-long hair; a hair length below the shoulders and above the waist may be regarded as the long hair; a hair length below the waist may be regarded as the extra-long hair. The hair length may be determined by a half-body or full-body image including the first face information.

In some examples, to ensure accuracy of determining the preferential matching range, the method further includes:
updating the second face information periodically or irregularly. For example, periodically or irregularly, a request is made to a device held by the second imaged subject for face information or an image including the face information of the second imaged subject.

The wear includes at least one of the following: glasses; clothing; accessories; or a bag.

For example, a user (for example, a person) may be one of the imaged subjects. Some users have visual impairment problems and may need to wear glasses for various vision correction such as myopia and hyperopia. In this way, the glasses may be used as a reference basis for determining the preferential matching range.

Different users may have different dressing styles, and clothes they like to wear may be different. In this implementation, the preferential matching range may also be determined according to clothes and accessories. For example, the preferential matching range is determined based on a clothing style.

The accessories may include: various types of accessories worn on the head, for example, an earring, a necklace. In some cases, some accessories have a specific meaning for a particular user, and are therefore worn for a long time. In this way, the preferential matching range may also be determined based on such accessories.

Some users like backpacks or shoulder bags, and some users do not like to carry bags. In this way, a bag or characteristics of a bag may also be used as a basis for determining the preferential matching range.

In the example of the present disclosure, the method further includes:
  determining the preferential matching range by selecting wear that is actually worn more frequently than a particular frequency. For example, in general, the wearing that is actually worn more frequently than the particular frequency may include: glasses, accessories with a specific meaning, and so on.

In this example, the subject attribute may be used for an initial screening, which may select the preferential matching range, so as to achieve the purpose of removing some of the second face information that does not match the first face information. Thus, an amount of information for actual face information comparing is reduced, an amount of the comparing is reduced, and a comparing speed is increased.

In some examples, obtaining the imaging parameter for collecting the first face information includes at least one of the following:
  obtaining an imaging location for collecting the first face information; or
  obtaining a spatial attribute of a space where the imaging location of the first face information is located.

The imaging location may include imaging latitude and longitude information, an imaging place name (the imaging place name may include: imaging identification information in a community level or a building level), and the like.

The spatial attribute of the space where the imaging location is located may include: usage information describing the use of the space. For example, the imaging location is a particular storefront in a shopping mall, and a spatial attribute of the storefront may include: information describing services or commodities sold by the storefront. For example, a coffee shop, a clothing store, etc.

The usage information may indicate a type of entertainment activities that may occur in an entertainment venue, or a name of a venue, for example, Beijing Workers' Stadium.

In some examples, step S120 may include:
  determining a fifth preferential matching range based on the imaging location, where a distance between the imaging location and a recorded latest appearance location of a second imaged subject, which corresponds to second face information included in the fifth preferential matching range, is within a first distance range; or
  determining a sixth preferential matching range based on an imaging location of a second imaged subject corresponding to the second face information comprised in the fifth preferential matching range, which includes: a recorded residential address, a recorded office address or a recorded location with an appearance frequency above a frequency threshold.

The location with the appearance frequency above the frequency threshold may include: a shopping mall, a restaurant, or a gym, etc., frequently visited by a user.

In this example, the latest appearance location of the second imaged subject may include: a location where the second imaged subject was last connected to the network, and a location where the second imaged subject was last consumed. Of course, appearance time of the latest appearance location here is within a specific time range, and the specific time range may be 30 minutes, 1 hour, 2 hours, or half a day. If a second imaged subject appears at the imaging location of the face information, it means that the second imaged subject has a higher probability to be the first imaged subject.

If the imaging location is a residential address, an office address, or a frequently visited place of a second imaged subject, a probability that the second imaged subject is the first imaged subject is relatively high, such that the address or the place may be included in the preferential matching range for matching in priority. On the one hand, it can improve the comparing efficiency. On the other hand, it can appropriately reduce the number of comparing operations and remove unnecessary invalid comparing operations.

In some examples, step S120 may include:
  determining a sixth preferential matching range based on the spatial attribute, where at least one piece of identification information of a second imaged subject corresponding to second face information included in the sixth preferential matching range is associated with the spatial attribute; or
  determining a seventh preferential matching range based on the space attribute, where device identification information of a device, which is held by a second imaged subject corresponding to second face information included in the seventh preferential matching range, is included in device identification information collected in the space corresponding to the spatial attribute.

In some examples, a specific space has a specific purpose, and it may issue identification information such as membership cards or application (APP) accounts. For example, in a sports equipment store targeting a specific group of people, facial information is collected and submitted to a server. To narrow the matching range, an image of a clerk in the sports equipment store may be prioritized as the second face information included in the preferential matching range.

In other examples, a lot of device identification information is collected in a predetermined space, and a correspondence among the space attribute, the collected device identification information and the face information of the corresponding user has been established in the information database. In this way, based on the spatial attribute, face information that has the correspondence may be determined as the second face information in the preferential matching range. The device identification information may include: an Internet Protocol (IP) address or a Media Access Control (MAC) address, an International Mobile Equipment Identity (IMEI) and so on. In specific implementation, the device identification information is not limited to any of the above. In some examples, the device identification information may further include: a communication identifier corresponding to a user identity identification (e.g., SIM) card installed in the device, for example, a mobile phone number.

In some examples, step S130 may include:
  in response to that there are at least two preferential matching ranges, determining an intersection of the at least two preferential matching ranges; and comparing the first face information with second face information in the intersection. For example, performing an intersection operation on the above first preferential matching range and seventh preferential matching range to obtain a final preferential matching range (that is, the intersection), and comparing the first face information with the second face information in the final preferential matching range at a first priority level. Since second face information belongs to the at least two preferential matching ranges has a higher probability of successfully matching the first face information, it is compared with the highest priority matching as the first priority level, which may determine the second face information that matches the first face information as quickly as possible.

In some examples, the method further includes:
comparing the first face information with second face information in the preferential matching ranges except the intersection at a second priority level, where the second priority level is lower than the first priority level.

In still other implementations, step S140 may include:
comparing the first face information with second face information outside the preferential matching ranges at a third priority level, where the third priority level is lower than the second priority level.

In some examples, if the first face information fails in matching the second face information in the intersection, the first face information is compared with the second face information in the preferential matching ranges except the intersection. In this way, comparing efficiency can be approved as much as possible while an amount of unnecessary comparing operations is reduced.

In some examples, the method further includes:
in response to that there are at least two pieces of second face information matched the first face information, obtaining a second attribute of the first face information;
comparing the second attribute with an attribute label of each piece of the second face information matched the first face information; and
selecting a piece of second face information of which the attribute label has highest similarity to the second attribute.

Comparing the first face information with the second face information may include:
comparing facial features in the two pieces of face information;
counting a number of facial features that reach a preset matching degree; and
in response to that the number of facial features reaches a number threshold, the two pieces of face information can be considered to be matched, otherwise the two pieces of face information can be considered to be mismatched.

In some examples, any method in the prior art can be used to determine whether the facial feature reaches the preset matching degree, and no further examples will be given here.

In some examples, second face information with the highest matching degree to the first face information may be used as a final matched result to identify the first imaged subject to which the first face information corresponds.

In still other examples, there are multiple pieces of second face information with the same matching degree, or there are multiple pieces of second face information with matching degrees higher than a matching degree threshold. In this case, the second attribute may be further assisted face recognition.

The second attribute here may be the same attribute parameter corresponding to the first attribute, or may be a different attribute parameter.

In some examples, the second attribute may include at least one of the following:
a consumption level,
a hobby, or
a social relationship, etc., where the social relationship may include: information on family status, marital status, etc.

These identity attributes describing the second imaged subject may be used as auxiliary information to assist in determining the final matched second face information.

For example, a possible consumption level of the first imaged subject may be obtained based on the spatial attribute. For example, if the imaging location is a particular hotel, the average consumption or the minimum consumption of the hotel may be used as the second attribute for matching a consumption level of the second imaged subject.

The hobby may be any information describing the likes and dislikes of the second imaged subject. For example, in the collected image information, the first imaged subject has a pet, then the favorite pet is used as the second attribute to assist in the comparing.

For another example, if the imaging location is a club, the hobby may be determined based on activities in the club. For example, for a basketball club, the second attribute may be loving basketball.

For yet another example, whether the first imaged subject has a partner or a social relationship such as a family may be determined as the second attribute based on body movements between the first imaged subject corresponding to the first face information and other subjects, where the first face information is included in the image information, the second face information matched the first face information may be further determined.

Therefore, in this example, the second attribute here may include a subject attribute, etc., and the second face information matched the first face information may be accurately determined finally, thereby achieving accurate face information matching and solving a problem that the identity of the first imaged subject cannot finally be identified if one piece of first face information matching multiple pieces of second face information. Moreover, in this example, since the preferential matching range is determined firstly, the probability of the first face information matched multiple pieces of second face information is reduced, thereby reducing the delay and operation caused by the need to finalize the matching of the second face information, and further improving the efficiency of the face matching.

For example, the second attribute may include multiple attribute values, and the multiple attribute values are compared with the identity attribute of the second imaged subject, and the second face information of the second imaged subject with the most successful matching attribute values is selected as a final matched result. The matched result may be used to identify the identity of the first imaged subject. Additionally or alternatively, an identity attribute label of a second imaged subject corresponding to the final matched result is output or transmitted to other devices as an identity attribute label of the first imaged subject.

In short, in the examples of the present disclosure, the first face information is compared with the second face information, the identity information and/or the identity attribute label corresponding to the second face information matched the first face information can be determined, so as to achieve targeted provision of a precise service, which may include: precise delivery of content data such as news and/or advertisements, for example, friend recommendations, etc.

In some examples, a combination of the identity attribute label and a location attribute label (a geographic location, a spatial attribute of the geographic location) of a location where the first imaged subject appears may be used to provide the precise service.

Figure 4:
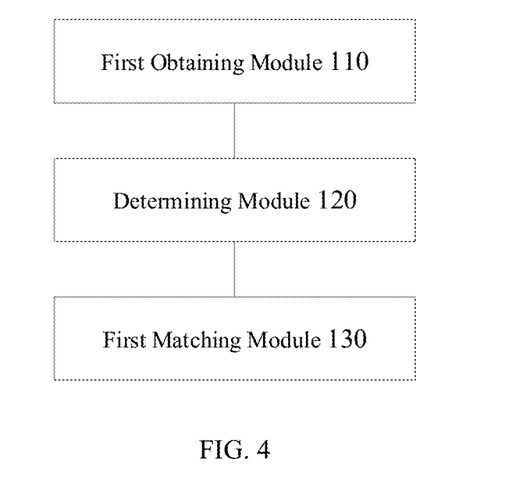
FIG. 4 illustrates a schematic structural diagram of a face matching apparatus according to an example of the present application.

As shown in FIG. 4, a face matching apparatus is provided according to an example, the apparatus includes:
- a first obtaining module 110 configured to obtain a first attribute of first face information which is to be matched;
- a determining module 120 configured to determine one or more preferential matching ranges based on the first attribute; and
- a first matching module 130 configured to compare the first face information with second face information in the one or more preferential matching ranges.

The face matching apparatus may be applied to a server or a terminal device described above, and may correspond to a client or a software development kit installed in various electronic devices.

The first obtaining module 110, the determining module 120, and the first matching module 130 can all be program modules, which can be executed by a processor to achieve the obtaining of the first attribute, the determining of the one or more preferential matching ranges, and the comparing of the face information.

Figure 5:
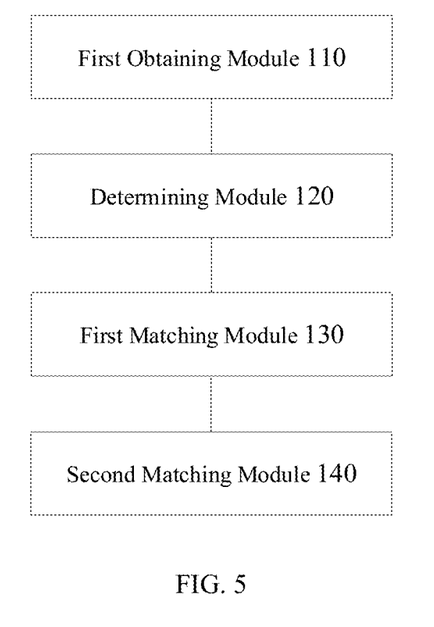
FIG. 5 illustrates a schematic structural diagram of another face matching apparatus according to an example of the present application.

In some examples, as shown in FIG. 5, the apparatus further includes: a second matching module 140, which is configured to, in response to the comparison result indicating that the first face information fails to match the second face information in the one or more preferential matching ranges, further compare the first face information with second face information outside the one or more preferential matching range.

In other examples, the first obtaining module 110 is configured to perform at least one of: obtaining a subject attribute of a first imaged subject based on the first face information; or obtaining an imaging parameter for collecting the first face information.

In still other examples, the first obtaining module 110 is configured to perform at least one of: obtaining a gender of the first imaged subject based on the first face information; obtaining an age of the first imaged subject based on the first face information; obtaining a hair length of the first imaged subject based on the first face information; or obtaining wear of the first imaged subject based on the first face information.

In still other examples, the determining module 120 is configured to perform at least one of: determining a first preferential matching range based on the gender of the first imaged subject, where a gender of a second imaged subject corresponding to second face information included in the first preferential matching range is the same as that of the first imaged subject; determining a second preferential matching range based on the age of the first imaged subject, where an age of a second imaged subject corresponding to second face information included in the second preferential matching range is matchable with that of the first imaged subject; determining a third preferential matching range based on the hair length of the first imaged subject, where a hair length of a second imaged subject corresponding to second face information included in the third preferential matching range is matchable with that of the first imaged subject; or determining a fourth preferential matching range based on the wear of the first imaged subject, where particular wearing or accessories of a second imaged subject corresponding to second face information included in the fourth preferential matching range is the same as that of the first imaged subject.

In some examples, the wear includes at least one of the following: glasses; clothing; accessories; or a bag.

In some examples, the first obtaining module 110 is configured to perform at least one of:
- obtaining an imaging location for collecting the first face information; or
- obtaining a spatial attribute of a space where the imaging location of the first face information is located.

Further, in some examples, the determining module 120 is configured to perform at least one of:
- determining a fifth preferential matching range based on the imaging location, where a distance between the imaging location and a recorded latest appearance location of a second imaged subject, which corresponds to second face information included in the fifth preferential matching range, is within a first distance range; or
- determining a sixth preferential matching range based on an imaging location of a second imaged subject corresponding to the second face information included in the fifth preferential matching range, which includes: a recorded residential address, a recorded office address, or a recorded location with an appearance frequency above a frequency threshold.

Further, the determining module 120 is configured to perform at least one of:
- determining a sixth preferential matching range based on the spatial attribute, where at least one piece of identification information of a second imaged subject corresponding to second face information included in the sixth preferential matching range is associated with the spatial attribute; or
- determining a seventh preferential matching range based on the space attribute, where device identification information of a device, which is held by a second imaged subject corresponding to second face information included in the seventh preferential matching range, is included in device identification information collected in the space corresponding to the spatial attribute.

In some examples, the first matching module 130 is configured to, in response to that there are at least two preferential matching ranges, determine an intersection of the at least two preferential matching ranges; and compare the first face information with second face information in the intersection.

In some examples, the first matching module is configured to obtain a union of at least two preferential matching ranges by merging the at least two preferential matching ranges; and compare the first face information with second face information in the union.

In still other examples, the first matching module is configured to obtain a union of at least two preferential matching ranges by merging the at least two preferential matching ranges; in response to that there are at least two preferential matching ranges, determine an intersection of the at least two preferential matching ranges; compare the first face information with second face information in the intersection at a first priority level; and compare the first face information with second face information in the union at a second priority level lower than the first priority level.

In some other examples, the apparatus further includes: a second obtaining module configured to, in response to that there are at least two pieces of second face information matched the first face information, obtain a second attribute of the first face information; a third matching module configured to compare the second attribute with an attribute label of each piece of the second face information matched the first face information; and a selecting module configured to select a piece of the second face information of which the attribute label has highest similarity to the second attribute.

Some specific examples are provided in combination with any of the above examples.

EXAMPLE 1

This example provides a face matching method. In this method, the face information to be matched (that is, the aforementioned first face information) may also be called as a face identity (ID), or FaceID for short. The face information is any face image taken offline, a record of the face information in a library may be matched. For example, face information collected by monitoring equipment at locations such as a hotel, a shopping mall, and a transportation site (an airport or a high-speed rail station).

To ensure accuracy, it is necessary to narrow the matching range as much as possible.

Step 1: Extract a photo. The photo may be an information source of the face information to be matched.

A high-quality photo (requiring a photo quality evaluation algorithm) is extracted. For example, various photo evaluation algorithms are used to extract a photo with a definition higher than a preset definition or with the highest definition; or according to face angles in photos, a photo whose face deformation is smaller than a preset deformation value is extracted; or a photo of a face captured at a predetermined imaging angle is extracted. The predetermined imaging angle is: an imaging angle between a front of an imaged subject and an imaging surface of an imaging device is less than a specific angle.

Step 2: Extract a first attribute. Before comparing, the user information is to be extracted to narrow a matching range. The information may be extracted by analyzing image information or analyzing an imaging space of the image information, so as to obtain a first attribute. The first attribute may include but not limited to any one of the following:

a gender;

an age; and wear (glasses, clothing, a bag, etc.).

Step 3: Set a preferential matching range. For example, after excluding records with different genders and age groups, face information comparing can be performed.

When comparing a FaceID in an offline scene, the preferential matching range may be set according to a characteristic of the scene and a requirement. For example, the preferential matching range has one of the following characteristics.

A target ID database serves as the preferential matching range. For example, after launching online marketing activities, IMEI data has been accumulated for a user group, and visiting customers are expected be counted. In this case, the characteristic of this scenario may be one of space attributes, which may describe a service provision attribute or usage of the space.

A MAC address collected on site is in the library (suitable for those with MAC collection devices on site).

A terminal device carried by a compared imaged subject has recently appeared near an imaging location of the FaceID to be matched.

A frequent consumption point associated with a compared imaged subject are near an imaging position of the FaceID to be matched.

A habitual residence of a compared imaged subject and an imaging location of the FaceID are in the same city.

An office location of a compared imaged subject and an imaging location of the FaceID are in the same city.

An age range of a compared imaged subject is close to the first imaged subject corresponding to the FaceID.

Common clothing of a compared imaged subject is the same as or similar to the first imaged subject corresponding to the FaceID.

Step 4: Full library comparing. The full library here may be the abbreviation of a full-volume database.

If there is no match within the preferential matching range, the full library comparing should be performed.

Step 5: Screen people and get a result.

Regardless of whether it is a preferential comparing or a full library comparing, there may be multiple records with similarity exceeding a set threshold. At this time, screening may be performed by setting the person attribute label, such as:

a consumption level, a hobby, family status

. . .

After screening, the highest similarity to the target among the remaining records is taken as a matched result.

Figure 6:
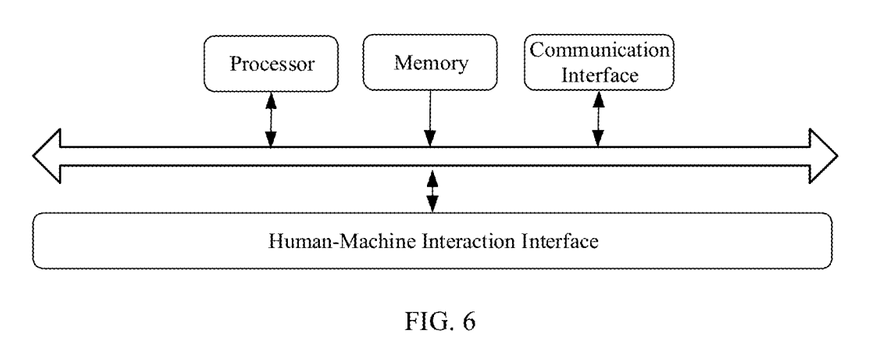
FIG. 6 illustrates a schematic structural diagram of an electronic device according to an example of the present application.

As shown in FIG. 6, a terminal device is provided by an example, the device includes:

a memory; and a processor coupled to the memory, and configured to implement the face matching method of the foregoing one or more technical solutions by executing computer executable instructions located on the memory. For example, the one or more of the face matching methods shown in FIGS. 1 and 3.

The memory may be various types of memories, such as a random access memory, a read-only memory, a flash memory, and so on. The memory can be used for information storage, for example, storing computer executable instructions. The computer executable instructions may be various program instructions, for example, target program instructions and/or source program instructions.

The processor may be various types of processors, for example, a central processor, a microprocessor, a digital signal processor, a programmable array, a digital signal processor, an application specific integrated circuit, or an image processor.

The processor may be coupled to the memory through a bus. The bus may be an integrated circuit bus or the like.

In some examples, the terminal device may further include: a communication interface. The communication interface may include: a network interface, for example, a local area network interface, a transceiver antenna, and the like. The communication interface is also coupled to the processor and may be used for information transmission and reception.

In some examples, the terminal device further includes a human-machine interaction interface. For example, the human-machine interaction interface may include various input and output devices, such as a keyboard, a touch screen, and so on.

A computer storage medium is provided by an example. The computer storage medium stores computer executable instructions. When the computer executable instructions are executed, the face matching methods provided by one or more of the foregoing technical solutions, for example, one or more of the face matching methods shown in FIGS. 1 and 3, are implemented.

The computer storage medium may include various recording media having a recording function, for example, various storage media such as a CD (Compact Disk), a floppy disk, a hard disk, a magnetic tape, a U disk, or a mobile hard disk. An optional computer storage medium may be a non-transitory storage medium, and the computer storage medium may be read by a processor. Thus, the computer executable instructions stored on the computer storage mechanism are obtained and executed by the processor to implement the face matching method provided by any one of the foregoing technical solutions, for example, a face matching method applied to a terminal device or a face matching method applied to an application server.

A computer program product is provided by an example. The computer program product includes computer executable instructions. When the computer executable instructions are executed, the face matching methods provided by one or more of the foregoing technical solutions, for example, one or more of the face matching methods shown in FIGS. 1 and/or 3, are implemented.

The computer program product includes a computer program tangibly included in a computer storage medium. The computer program includes program code for executing the method shown in the flowchart. The program code may include instructions corresponding to executing the method steps provided by the examples of the present application.

In the several examples provided by the present disclosure, it should be understood that the disclosed device and method can be implemented in other ways. The device examples described above are only illustrative. For example, the division of units is only a logical function division. In actual implementation, there can be other division manners, such as: multiple units or components can be combined or can be integrated into another system, or some features can be ignored or not implemented. In addition, the coupling, or direct coupling, or communication connection between the components shown or discussed may be indirect coupling or communication connections through some interfaces, devices or units, which may be electrical, mechanical, or other forms.

The above-mentioned units described as separate components may or may not be physically separated, and the components displayed as units may or may not be physical units, that is, they can be located in one place or distributed to multiple network units. Some or all of the units can be selected according to actual needs to achieve the purpose of the solutions of the examples.

In addition, the functional units in the examples of the present application can all be integrated into one processing module, or each unit can be separately used as a single unit, or two or more units can be integrated into one unit. The above integrated unit can be implemented in a form of hardware, or in a form of hardware plus a software functional unit.

Those of ordinary skill in the art can understand that all or part of the steps of the above method examples can be completed by hardware associated with program instructions. The foregoing program can be stored in a computer readable storage medium, and when the program is executed, the steps of the above method examples are executed. The storage medium includes: a mobile storage device, a read-only memory (ROM), a random access memory (RAM), a magnetic disk or a compact disk, and any other medium that can store program code.

The foregoing is merely implementation of the present application, but a scope of protection of the present application is not limited thereto, and any variation or replacement readily conceivable by a person skilled in the art within the technical scope disclosed in the present application should be covered within the scope of protection of the present application. Therefore, the scope of protection of the present application shall be subject to a scope of protection of the claims.

The invention claimed is:

1. A face matching method, applied to a server, and comprising:
   acquiring first face information which is to be matched from a terminal device, wherein the first face information comprises an image including a face;
   obtaining a first attribute of the first face information;
   determining one or more preferential matching ranges based on the first attribute; and
   comparing the first face information with second face information in the one or more preferential matching ranges,
   wherein comparing the first face information with the second face information in the one or more preferential matching ranges comprises:
   in response to that there are at least two preferential matching ranges,
      determining an intersection of the at least two preferential matching ranges, and comparing the first face information with second face information in the intersection; or
      obtaining a union of at least two preferential matching ranges by merging the at least two preferential matching ranges, and comparing the first face information with second face information in the union; or
      determining the intersection of the at least two preferential matching ranges, comparing the first face information with the second face information in the intersection at a first priority level, obtaining the union of the at least two preferential matching ranges by merging the at least two preferential matching ranges, and comparing the first face information with the second face information in the union at a second priority level lower than the first priority level.

2. The method of claim 1, further comprising:
   in response to a comparison result indicating that the first face information fails to match the second face information in the one or more preferential matching ranges, comparing the first face information with second face information outside the one or more preferential matching ranges.

3. The method of claim 1, wherein obtaining the first attribute of the first face information which is to be matched comprises at least one of:
   obtaining a subject attribute of a first imaged subject based on the first face information; or
   obtaining an imaging parameter for collecting the first face information.

4. The method of claim 3, wherein obtaining the subject attribute of the first imaged subject based on the first face information comprises at least one of:
   obtaining a gender of the first imaged subject based on the first face information;
   obtaining an age of the first imaged subject based on the first face information;
   obtaining a hair length of the first imaged subject based on the first face information; or obtaining wear of the first imaged subject based on the first face information.

5. The method of claim 4, wherein determining the one or more preferential matching ranges based on the first attribute comprises at least one of:
    determining a first preferential matching range based on the gender of the first imaged subject, wherein a gender of a second imaged subject corresponding to second face information comprised in the first preferential matching range is the same as that of the first imaged subject;
    determining a second preferential matching range based on the age of the first imaged subject, wherein an age of a second imaged subject corresponding to second face information comprised in the second preferential matching range is matchable with that of the first imaged subject;
    determining a third preferential matching range based on the hair length of the first imaged subject, wherein a hair length of a second imaged subject corresponding to second face information comprised in the third preferential matching range is matchable with that of the first imaged subject; or
    determining a fourth preferential matching range based on the wear of the first imaged subject, wherein particular wearing or accessories of a second imaged subject corresponding to second face information comprised in the fourth preferential matching range is the same as that of the first imaged subject.

6. The method of claim 4, wherein the wear comprises at least one of:
    glasses;
    clothing;
    accessories; or
    a bag.

7. The method of claim 3, wherein obtaining the imaging parameter for collecting the first face information comprises at least one of:
    obtaining an imaging location for collecting the first face information; or
    obtaining a spatial attribute of a space where the imaging location of the first face information is located.

8. The method of claim 7, wherein determining the one or more preferential matching ranges based on the first attribute comprises at least one of:
    determining a fifth preferential matching range based on the imaging location, wherein a distance between the imaging location and a recorded latest appearance location of a second imaged subject, which corresponds to second face information comprised in the fifth preferential matching range, is within a first distance range; or
    determining a sixth preferential matching range based on an imaging location of a second imaged subject corresponding to the second face information comprised in the fifth preferential matching range, which comprises: a recorded residential address, a recorded office address, or a recorded location with an appearance frequency above a frequency threshold.

9. The method of claim 7, wherein determining the one or more preferential matching ranges based on the first attribute comprises at least one of:
    determining a sixth preferential matching range based on the spatial attribute, wherein at least one piece of identification information of a second imaged subject corresponding to second face information comprised in the sixth preferential matching range is associated with the spatial attribute; or
    determining a seventh preferential matching range based on the spatial attribute, wherein device identification information of a device, which is held by a second imaged subject corresponding to second face information comprised in the seventh preferential matching range, is comprised in device identification information collected in the space corresponding to the spatial attribute.

10. The method of claim 1, further comprising:
    in response to that there are at least two pieces of second face information matched the first face information, obtaining a second attribute of the first face information;
    comparing the second attribute with an attribute label of each piece of the at least two pieces of second face information matched the first face information; and
    selecting a piece of the second face information of which the attribute label has highest similarity to the second attribute.

11. An electronic device, applied to a server, and comprising:
    a processor; and
    a memory storing instructions executable by the processor,
    wherein the processor is configured to:
        acquire first face information which is to be matched from a terminal device,
    wherein the first face information comprises an image including a face;
        obtain a first attribute of the first face information;
        determine one or more preferential matching ranges based on the first attribute; and
        compare the first face information with second face information in the one or more preferential matching ranges,
    wherein the processor is further configured to:
        in response to that there are at least two preferential matching ranges,
        determine an intersection of the at least two preferential matching ranges, and compare the first face information with second face information in the intersection; or
        obtain a union of at least two preferential matching ranges by merging the at least two preferential matching ranges, and compare the first face information with second face information in the union; or
        determine the intersection of the at least two preferential matching ranges, compare the first face information with the second face information in the intersection at a first priority level, obtain the union of the at least two preferential matching ranges by merging the at least two preferential matching ranges, and compare the first face information with the second face information in the union at a second priority level lower than the first priority level.

12. The electronic device of claim 11, wherein the processor is further configured to:
    in response to a comparison result indicating that the first face information fails to match the second face information in the one or more preferential matching ranges, further compare the first face information with second face information outside the one or more preferential matching ranges.

13. The electronic device of claim 11, wherein the processor is further configured to:

in response to that there are at least two pieces of second face information matched the first face information, obtain a second attribute of the first face information;

compare the second attribute with an attribute label of each piece of the at least two pieces of second face information matched the first face information; and select a piece of the second face information of which the attribute label has highest similarity to the second attribute.

14. A non-transitory computer storage medium storing computer executable instructions that, when executed, cause a processor of a server to:

acquire first face information which is to be matched from a terminal device, wherein the first face information comprises an image including a face;

obtain a first attribute of the first face information;

determine one or more preferential matching ranges based on the first attribute; and compare the first face information with second face information in the one or more preferential matching ranges, wherein the processor is further caused to:

in response to that there are at least two preferential matching ranges, determine an intersection of the at least two preferential matching ranges, and compare the first face information with second face information in the intersection; or obtain a union of at least two preferential matching ranges by merging the at least two preferential matching ranges, and compare the first face information with second face information in the union; or determine the intersection of the at least two preferential matching ranges, compare the first face information with the second face information in the intersection at a first priority level, obtain the union of the at least two preferential matching ranges by merging the at least two preferential matching ranges, and compare the first face information with the second face information in the union at a second priority level lower than the first priority level.

* * * * *